United States Patent [19]

Paton et al.

[11] Patent Number: 4,475,722

[45] Date of Patent: Oct. 9, 1984

[54] SUSPENSION STRUT

[75] Inventors: H. Neil Paton, 2521 W. Montlake Pl. E.; John B. Skilling, 539 McGilvra Blvd., E., both of Seattle, Wash. 98112; Jeffery P. Sandys; E. Frederick Gylland, Jr., both of Seattle, Wash.

[73] Assignees: H. Neil Paton; John B. Skilling, both of Seattle, Wash.

[21] Appl. No.: 349,583

[22] Filed: Feb. 17, 1982

Related U.S. Application Data

[63] Continuation-in-part of Ser. No. 242,511, Mar. 10, 1981, Pat. No. 4,358,096, which is a continuation of Ser. No. 16,533, Mar. 11, 1979, abandoned.

[51] Int. Cl.$^3$ .............................................. F16F 3/10
[52] U.S. Cl. .................................................. 267/9 C
[58] Field of Search ............... 188/129; 267/8 R, 9 R, 267/9 B, 9 C, 22 R, 33, 63 R; 280/668, 696-698

[56] References Cited

U.S. PATENT DOCUMENTS

| | | |
|---|---|---|
| Re. 20,030 | 7/1936 | Ledwinka . |
| 769,841 | 9/1904 | Shepard . |
| 2,381,404 | 8/1945 | Cottrell . |
| 2,490,738 | 12/1949 | Lehrman . |
| 2,497,829 | 2/1950 | Baselt . |
| 2,516,072 | 7/1950 | Piron . |
| 2,534,419 | 12/1950 | Dath . |
| 2,549,036 | 4/1951 | Withall . |
| 2,552,668 | 5/1951 | Dath . |
| 2,614,831 | 10/1952 | Withall . |
| 2,752,149 | 6/1956 | Forcellini . |
| 2,767,858 | 10/1956 | Fillion . |
| 2,814,392 | 11/1957 | Campbell . |
| 2,819,060 | 1/1958 | Neidhart . |
| 2,841,292 | 7/1958 | Campbell . |
| 3,161,420 | 12/1964 | Rix . |
| 3,178,036 | 4/1965 | Cardwell . |
| 3,402,924 | 9/1968 | Rix . |
| 3,409,284 | 11/1968 | Rix . |
| 3,417,986 | 12/1968 | Fuke . |
| 3,434,708 | 3/1969 | Hawk, Jr. . |
| 3,480,268 | 11/1969 | Fishbaugh . |
| 3,537,696 | 11/1970 | Webster, Jr. . |
| 3,640,545 | 2/1972 | Citroen . |
| 3,677,535 | 7/1972 | Beck . |
| 3,713,516 | 1/1973 | Freyler . |
| 3,762,694 | 10/1973 | MacDonnell . |
| 3,820,634 | 6/1974 | Poe . |
| 4,010,940 | 3/1977 | Freyler . |
| 4,032,125 | 6/1977 | Minakawa et al. . |
| 4,089,511 | 5/1978 | Palmer . |
| 4,105,222 | 8/1978 | Buchwald . |
| 4,106,596 | 8/1978 | Hausmann . |
| 4,140,304 | 2/1979 | Ghrist . |

FOREIGN PATENT DOCUMENTS

| | | |
|---|---|---|
| 709080 | 5/1954 | United Kingdom . |
| 771392 | 4/1957 | United Kingdom . |
| 832878 | 4/1960 | United Kingdom . |
| 1489473 | 10/1977 | United Kingdom . |

Primary Examiner—Duane A. Reger
Attorney, Agent, or Firm—Finnegan, Henderson, Farabow, Garrett & Dunner

[57] ABSTRACT

The strut includes a reciprocative load bearing assembly and one, two or more sets of springs, either elastomeric or coil type, which operate either singularly, in parallel or in series to provide a variable rate spring force. A frictional or "coulomb" damper is operated by one or more of the spring sets to provide a variable rate damping force. The strut provides a substantially constant ride frequency over a wide range of load conditions and is especially adapted for rubber tired vehicle application.

14 Claims, 26 Drawing Figures

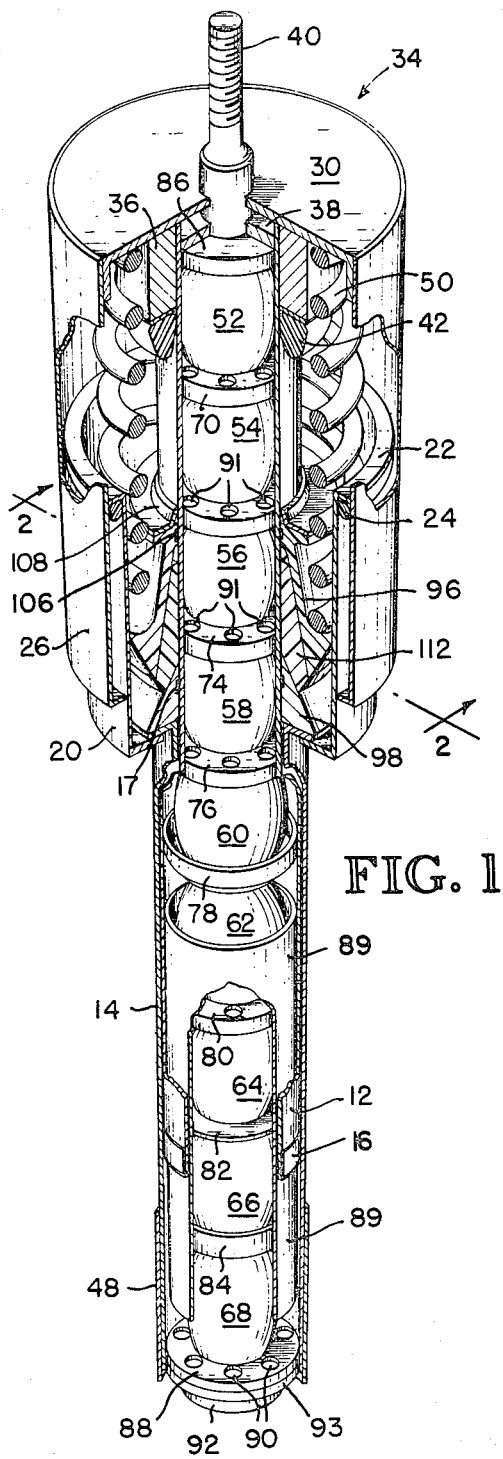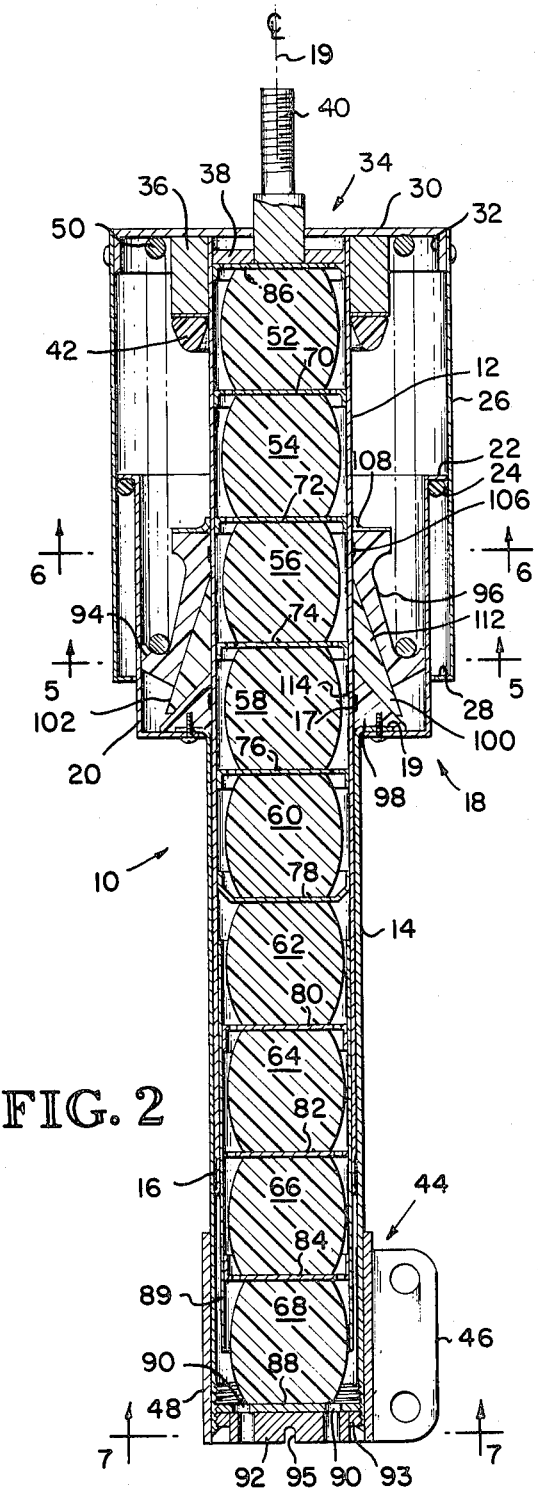
FIG. 1
FIG. 2

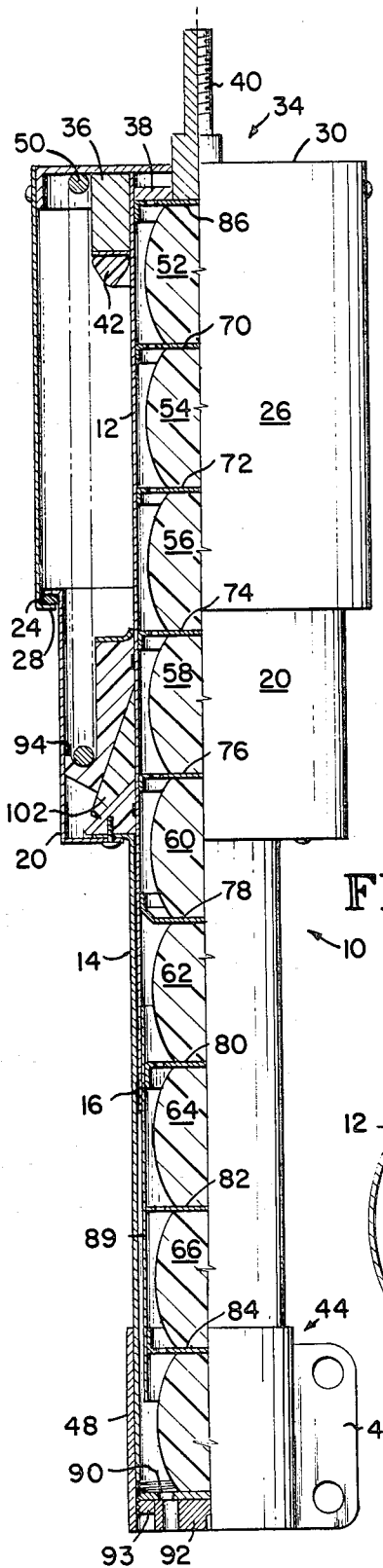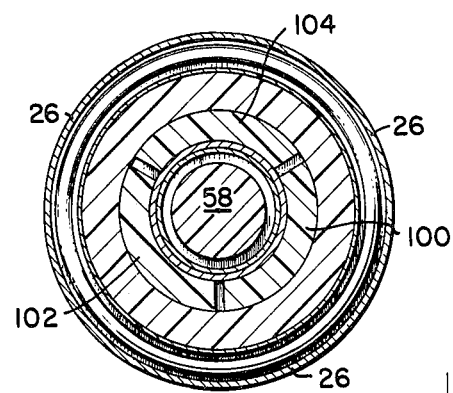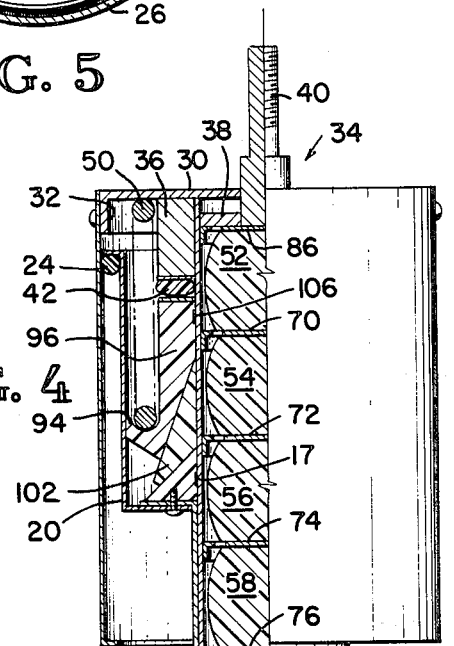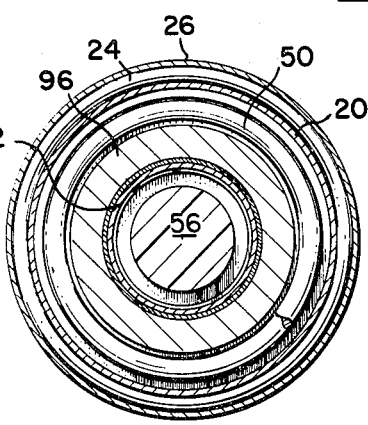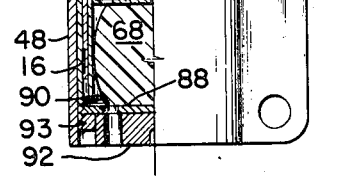

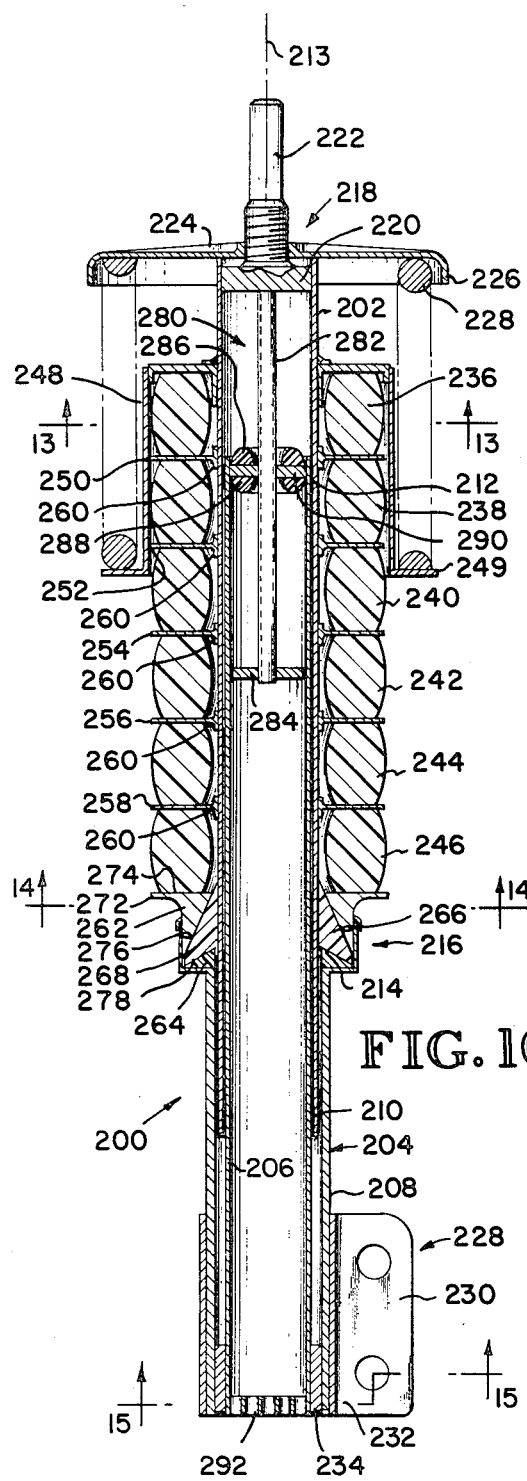
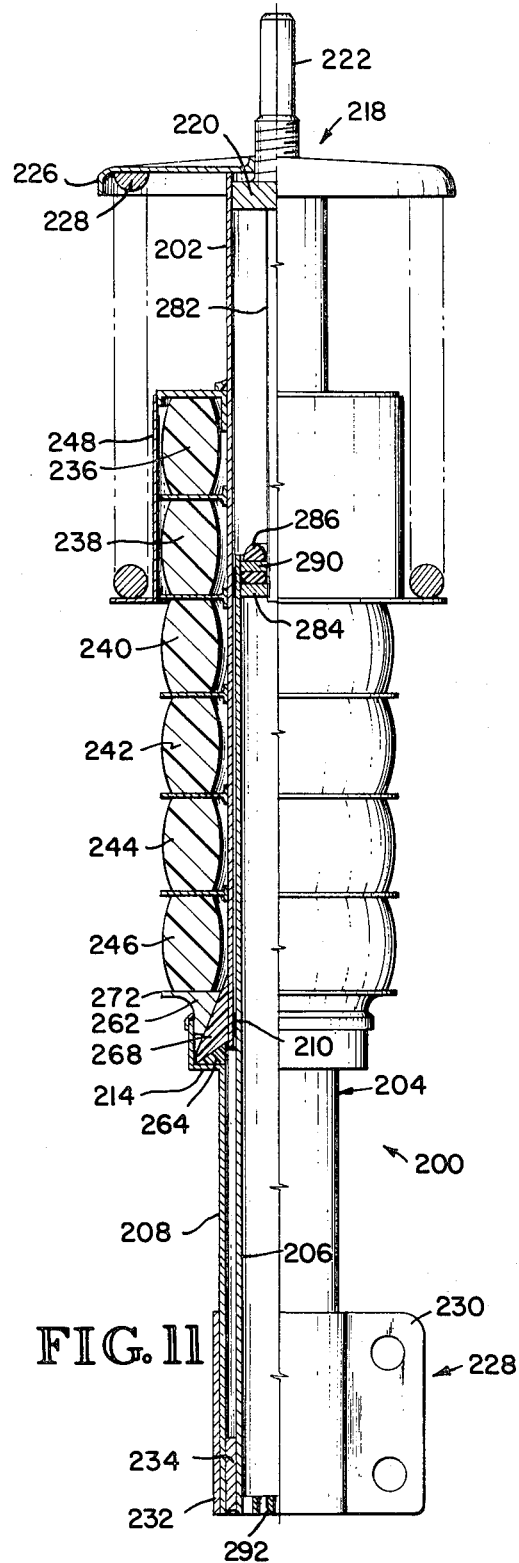
FIG. 10
FIG. 11

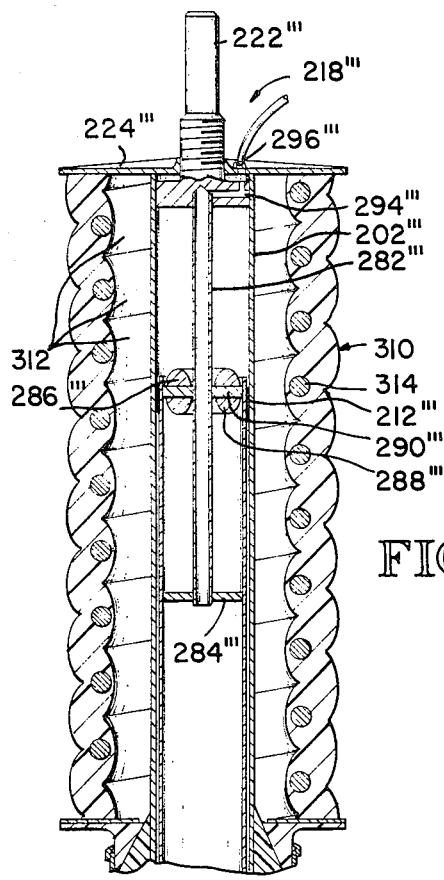
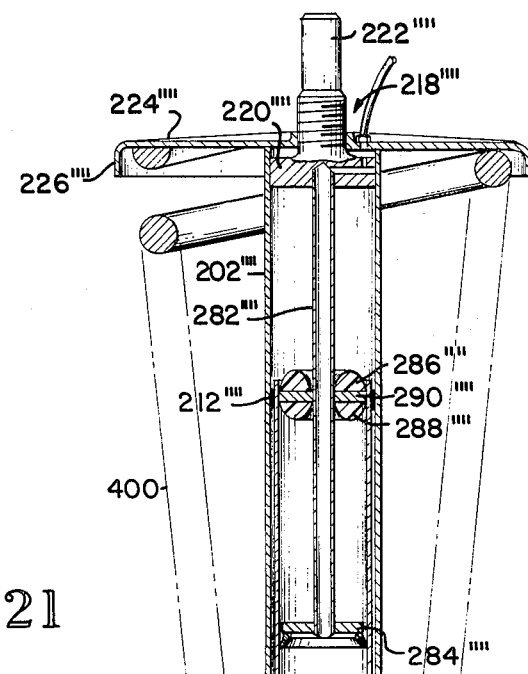
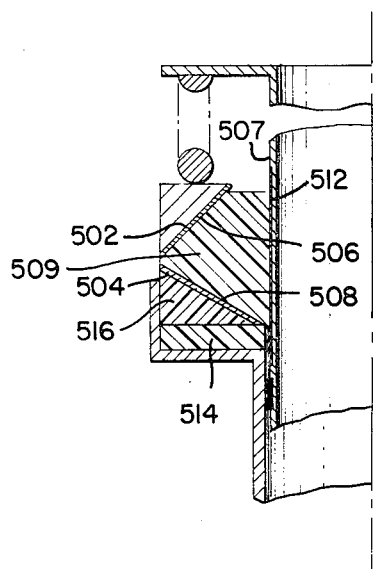
FIG. 21
FIG. 22
FIG. 23

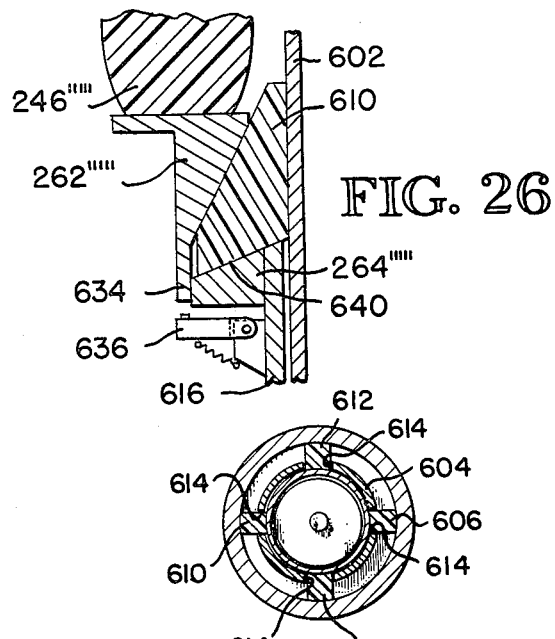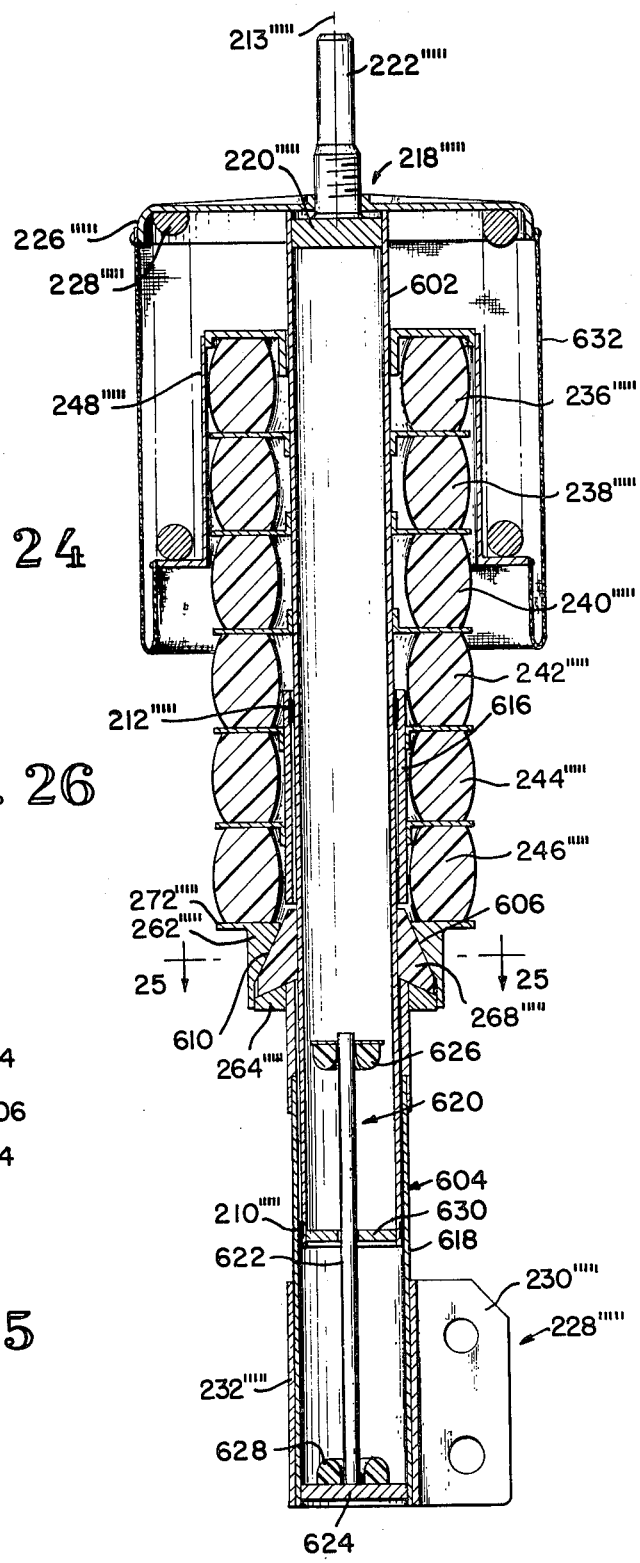
FIG. 24
FIG. 26
FIG. 25

SUSPENSION STRUT

CROSS REFERENCE TO RELATED APPLICATIONS

This application is a continuation-in-part of Ser. No. 06/242,511, filed Mar. 10, 1981, now U.S. Pat. No. 4,358,096, which is a continuation of Ser. No. 06/016,533, filed Mar. 11, 1979, now abandoned.

BACKGROUND OF THE INVENTION

This invention relates to vehicle suspensions and, more particularly, to strut type vehicle suspensions in which one or more spring members are employed in combination with shock absorbers or frictional damping means. While three presently preferred embodiments of the invention are illustrated and described herein for application to rubber tired vehicles, the invention is not limited to such applications and may be used with other types of vehicles, other suspensions, and even in non-vehicular applications and environments.

Strut type suspension systems are especially adaptable for use with modern lightweight vehicles, but in general provide unsatisfactory ride qualities over the entire range of vehicle load conditions. Typical suspension struts, such as the MacPherson strut, are made up of conventional helical coil springs in combination with hydraulic shock absorbers. The ride frequency obtained with these, however, tends to be highly load sensitive since it is a function of the spring rate of the coil springs and sprung mass of the vehicle. Although it is possible to obtain a desirable ride frequency at a single predetermined load, the coil spring provides a spring force which is directly proportional to load, based upon its constant spring rate, causing the ride frequency to vary when the vehicle is loaded above or below the predetermined load. Consequently, the ride frequency often degrades when the vehicle is loaded at loads other than the predetermined load.

In modern lightweight vehicles, the load conditions vary substantially, often to the extent that the vehicle has a fully loaded spring mass which is 20 percent to 30 percent greater than its empty sprung mass. In these vehicles, the predetermined load typically is selected to approximate an optimum load which occurs when the vehicle is loaded at a median load within this range. Thus, the ride frequency obtained is satisfactory only when the vehicle is loaded at or near optimum load, but tends to become higher than desirable when the vehicle is light, and lower than desirable when it is loaded. This often leads to passenger discomfort, bottoming out of the springs, and even occasional breakage of the springs. In most practical cases, therefore, conventional suspension struts such as those discussed above provide uncomfortable ride either at light load conditions, heavy load conditions, or both, depending upon the optimum load selected.

Suspension struts of the type described tend to provide insufficient damping at all practical load conditions experienced in light vehicles for similar reasons. Since the damping coefficient is inversely proportional to the sprung mass of the vehicle, the damping force applied tends to decline in magnitude with increasing vehicle load. Consequently, the struts often appear over-damped at light loads and under-damped at heavy loads, and therefore are susceptible to further degradation in ride frequency when the vehicle is loaded at other than the optimum load mentioned above. Further, the damping force applied by these struts is velocity dependent so that they vary in stiffness depending upon whether they are subjected to high or low frequency shock loads. This of course tends to compound the undesirable effects of ride frequency degradation from the standpoint of passenger comfort.

Such suspension struts also tend to impair cornering performance when employed as front suspensions due to the reduced stiffness which results from under-damping as described above. Most front suspensions therefore include torsional stabilizers or roll bars which compensate for the loss in strut stiffness due to under-damped conditions when the vehicle is negotiating a curve. Such roll bars and their attendant mounting structure, however, tend to increase the weight, complexity and cost of such suspensions.

Hydraulic shock absorbers used in such suspension struts tend to be unsatisfactory for additional reasons, among which are temperature sensitivity and hence unreliable damping capability due to thinning of the hydraulic fluid with increased temperature, fluid frothing due to air entrapment and fluid leakage. As a consequence, such strut type suspensions require many close-tolerance machined parts, seals, and valves, and an otherwise relatively sophisticated and hence costly construction in order to maintain acceptable performance and life cycle characteristics. This results in increased weight and greater numbers of parts and hence reduced reliability and high cost. Further, the piston and cylinder components of such hydraulic shock absorbers tend to be susceptible to sticking or damage when subjected to bending loads such as those encountered in many automotive applications.

The term "ride frequency" as used herein refers to the frequency at which the sprung mass of a vehicle or other object supported by the suspension strut oscillates in response to application of a force thereto. Although the term may be used hereinafter with respect to oscillatory movement of a rubber tired vehicle, it should be understood that such usage is for illustrative purposes only, and that the invention may be used in other applications and environments, as mentioned above.

Summary of the Invention

The suspension strut of this invention provides a variable rate spring force and a variable rate damping force which, in combination, maintain a substantially constant ride frequency over a range of loads heretofore not obtainable without degradation in ride frequency. The suspension strut is comprised of one, two or more spring sets which operate either singularly, in series, or in parallel to provide a variable rate spring force, and a damping assembly which is operated by one or more of the spring sets to provide a damping or drag force proportional to applied load. Each spring set is made up of one or more variable or constant rate springs, either elastomeric or coil type, or both, selected to provide a ride frequency that will remain substantially constant over a range of applied loads. By appropriate selection of the spring or springs used in accordance with this invention, the frequency constant load range may be matched to a predetermined load range corresponding to variations in sprung mass of a vehicle for example, so that the ride frequency obtained will remain substantially constant throughout the entire range of practical vehicle load conditions. The ride frequency, however, may be made to increase somewhat under heavy load conditions when it is desirable to provide increased strut stiffness during cornering, for example.

According to two presently preferred embodiments of this invention, elastomeric springs and coil springs, in combination, either in parallel (first embodiment) or in series (second embodiment) provide a variable rate spring force which may be controlled in relation to the sprung mass of the vehicle, depending upon the number, durometer, shape factor and other characteristics of the elastomeric springs, together with the size and type of coil springs used. The damping assembly is made up of a variable rate or "coulomb" frictional damper which is operatively associated with the springs to provide a variable rate damping or drag force for further control of the ride frequency obtained. According to a third presently preferred embodiment of this invention, a single spring, preferably a non-linear spring rate coil spring, provides a similar spring force and operates in combination with such a damping assembly. In all three preferred embodiments, the normal force for operating the damping assembly is derived from a component of the spring force obtained so that the damping assembly does not require a separate spring element.

The suspension strut further includes a telescopic load bearing assembly made up of two sections that are movable reciprocatively from a neutral or design position toward an extended or rebound position and a contracted or jounce position. The assembly includes multiple low friction bearings interposed between the sections to promote free telescopic movement thereof. These bearings preferably are spaced apart as far as possible so as to minimize the effects of bending loads. The preferred frictional damping assembly includes one or more damper shoes which are urged against and apply a frictional damping or drag force to the load bearing assembly during extension and contraction thereof in response to the spring force applied by the spring or springs which make up the spring set or sets mentioned above. Each damper shoe is so constructed and arranged with respect to the direction of the applied spring force and the direction of movement of the load bearing assembly that the magnitude of the damping or drag force applied during movement of the assembly in one direction may differ from that applied during movement of the assembly in the opposite direction. It is possible, by selecting specific damper shoe constructions in accordance with this invention, to control the damping or drag forces bidirectionally. With this construction, therefore, the damping force applied during extension of the strut under rebound conditions could be made greater than that applied during contraction of the strut under jounce conditions.

As will now be appreciated from the foregoing summary, the present invention overcomes and eliminates the above-mentioned drawbacks and problems associated with conventional suspension struts of the type described by providing a suspension strut capable of maintaining desired ride qualities over a broad load range. Accordingly, this invention is particularly suited for, but not limited to, use with modern lightweight rubber tired vehicles. This invention further provides a suspension strut which offers substantial economies, versatility, reliability, and life cycle characteristics heretofore not obtainable with the MacPherson strut or other conventional suspension struts. In many practical cases, moreover, the preferred suspension strut should possess superior resistance to bending loads and may be used without torsional stabilizers or roll bars while providing adequate cornering stiffness.

These and other features, objects, and advantages of the present invention will become apparent from the detailed description and claims to follow, taken in conjunction with the accompanying drawings in which like parts bear like reference numerals.

Brief Description of the Drawings

FIG. 1 is a perspective of a first presently preferred embodiment of the suspension strut of this invention, with parts broken away;

FIG. 2 is a longitudinal section taken along the line 2—2 in FIG. 1, depicting the strut in its neutral or design ride position;

FIG. 3 is a partial section generally similar to FIG. 2, depicting the strut in its extended or rebound position;

FIG. 4 is a partial section generally similar to FIG. 2, depicting the strut in its contracted or jounce position;

FIG. 5 is a section taken along the line 5—5 in FIG. 2;

FIG. 6 is a section taken along the line 6—6 in FIG. 2;

FIG. 10 is a longitudinal section of a second presently preferred embodiment of the suspension strut of this invention;

FIG. 11 is a partial longitudinal section generally similar to FIG. 10, depicting the FIG. 10 strut in its extended or rebound position;

FIG. 21 is a partial longitudinal section generally similar to FIG. 20, depicting a modified elastomeric spring for the FIG. 20 strut;

FIG. 22 is a longitudinal section of a third presently preferred embodiment of the suspension strut of this invention;

FIG. 23 is a longitudinal section of a modified damping assembly for any of the FIG. 1, FIG. 10 or FIG 22 struts;

FIG. 24 is a longitudinal section of a modified load bearing assembly for the FIG. 10 or FIG. 22 struts;

FIG. 25 is a section taken along the line 25—25 in FIG. 24; and

FIG. 26 is a longitudinal section of a wear indicator for the damping assembly of any of the FIG. 10 or FIG. 22 struts, depicted in application to the FIG. 24 load bearing assembly.

Detailed Description of the Drawings

Figure 8:
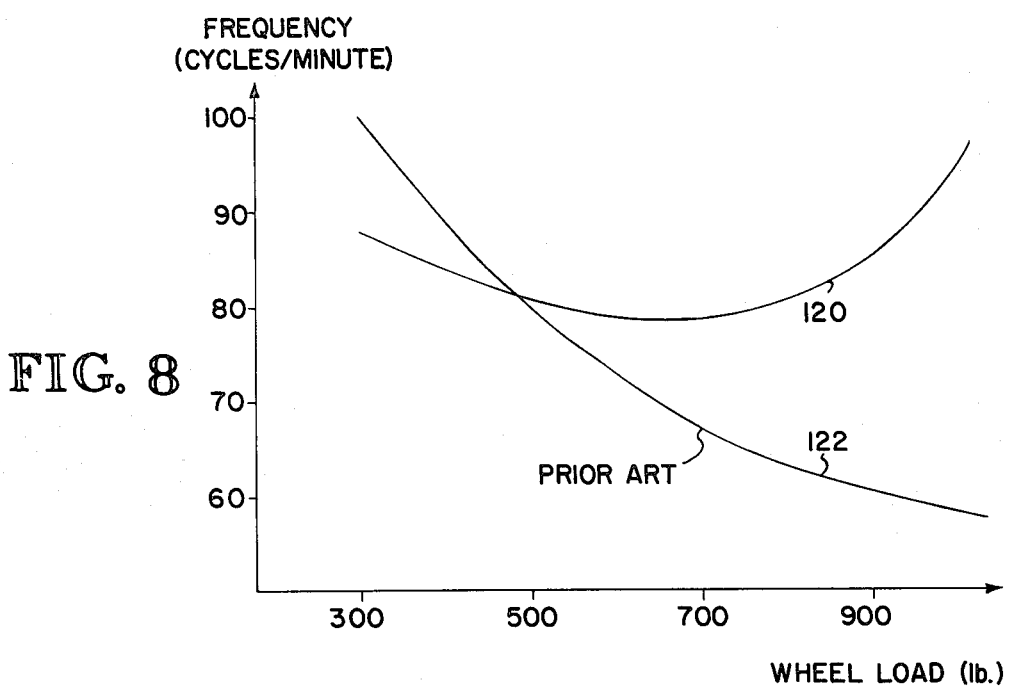
FIG. 8 is a graph of ride frequency vs. vehicle load of the FIG. 1 strut and a prior art strut.
Figure 7:
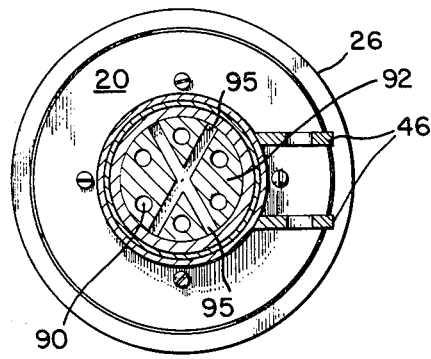
FIG. 7 is a section taken along the line 7—7 in FIG. 2.
Figure 9:
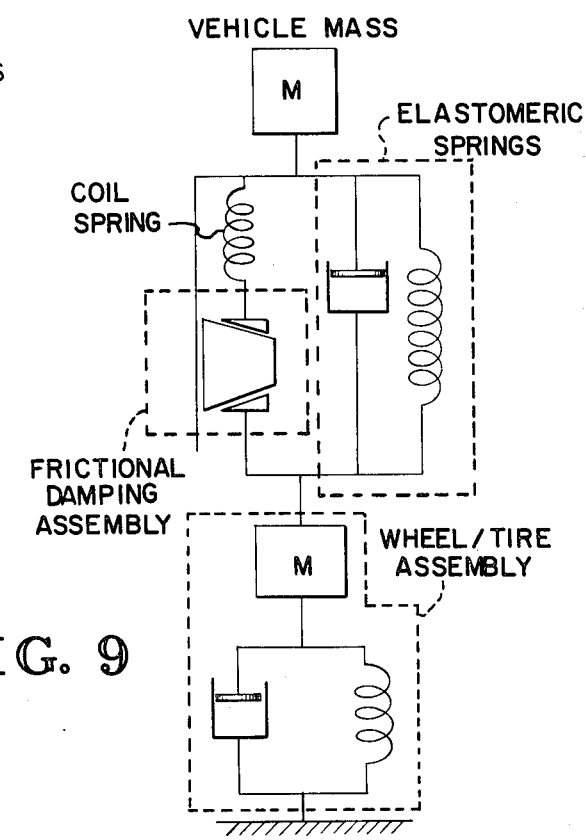
FIG. 9 is a schematic depicting the mass, spring and damping elements of the FIG. 1 strut.
Figure 12:
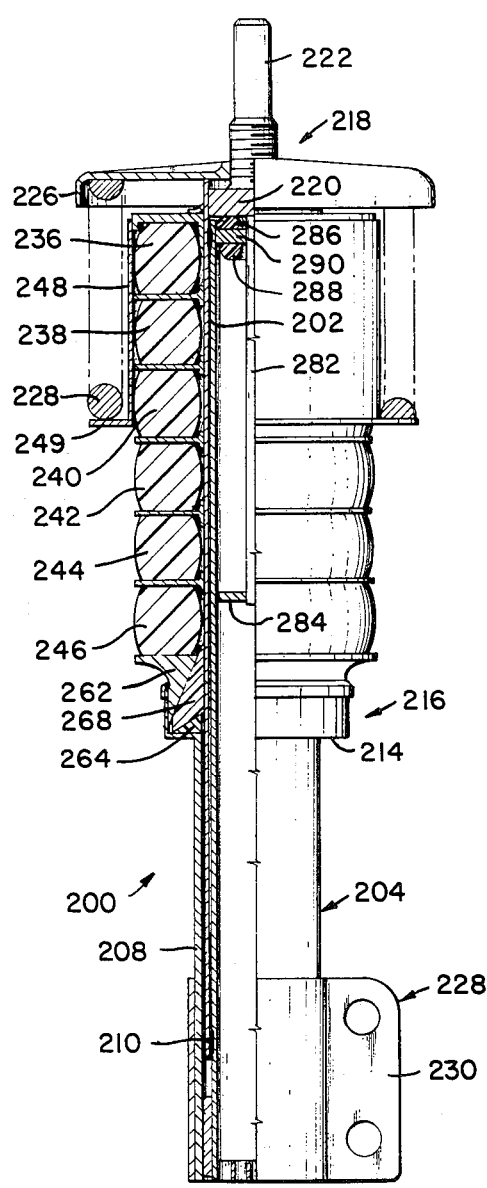
FIG. 12 is a partial longitudinal section generally similar to FIG. 10, depicting the FIG. 10 strut in its contracted or jounce position.
Figure 13:
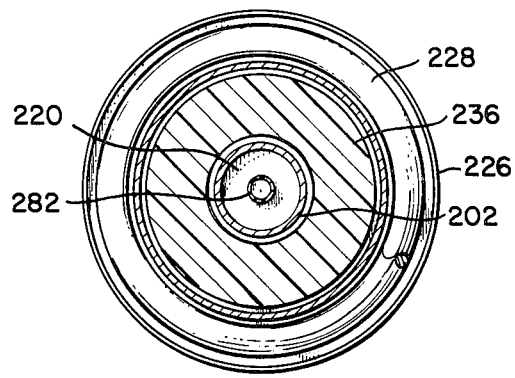
FIG. 13 is a section taken along the line 13—13 in FIG. 10.
Figure 14:
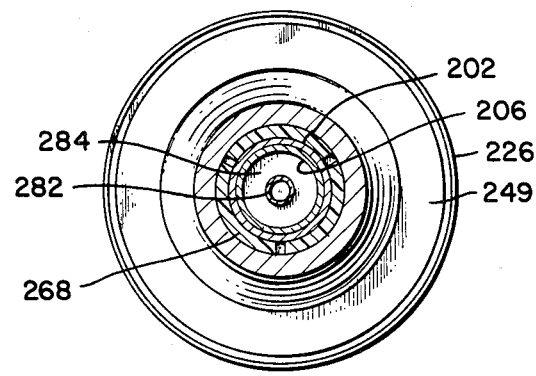
FIG. 14 is a section taken along the line 14—14 in FIG. 10.
Figure 19:
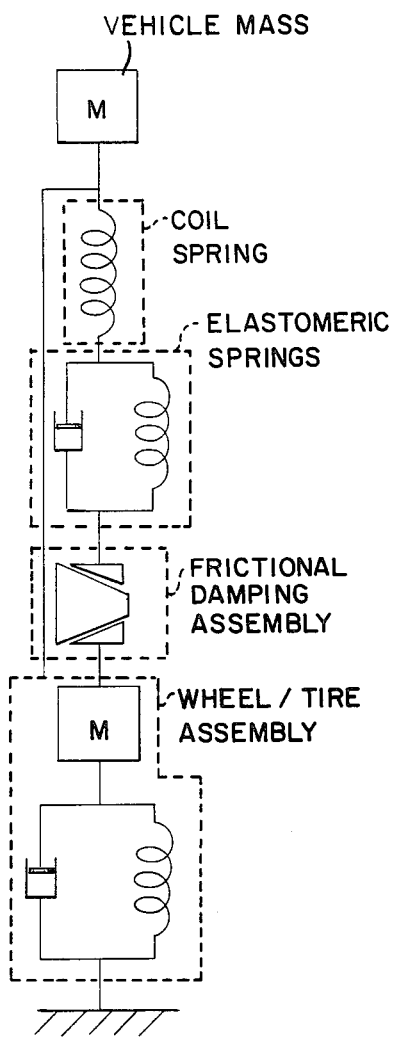
FIG. 19 is a schematic depicting the mass, spring and damping elements of the FIG. 10 strut.

Three presently preferred embodiments of the invention and exemplary modifications thereof are described in detail hereinafter and are illustrated in the drawings, the first and second embodiments including two sets of springs operable in parallel and in series, respectively, and the third embodiment including one spring set operable singularly. In a first presently preferred embodiment of the invention, illustrated in FIGS. 1-6, elastomeric springs and a constant rate coil spring operate in parallel, as depicted schematically in FIG. 9. In a second presently preferred embodiment of the invention, illustrated in FIGS. 10-15, elastomeric springs and a constant rate coil spring operate in series, as depicted schematically in FIG. 19. In a third presently preferred embodiment of the invention, illustrated in FIG. 22, a single variable rate coil spring operates as the sole source of spring force. The three strut embodiments further include essentially identical damping assemblies, except that the FIGS. 1-6 damping assembly is operated by a force derived from the coil spring, while the FIGS. 10-15 damping assembly is operated by a force derived from the elastomeric springs in series with the coil spring. The FIG. 22 damping assembly is operated by a force derived from the sole spring source. The spring set or sets and damping assembly of each embodiment operate, in combination, with a reciprocative load bearing assembly made up of telescopically movable sections, to be described presently.

In operation, the strut embodiments operate similarly, except that the FIGS. 10-15 strut embodiment may be relatively stiffer under higher load conditions due to bottoming of the coil springs or selected elastomeric springs as will be described presently. That is, it is possible to by-pass selected elements of the coil or elastomeric springs in the FIGS. 10-15 strut embodiments to obtain staged stiffness in which the strut appears stiffer at higher loads than it does at lower loads. For a particular overall strut length, the FIGS. 10-15 strut embodiment also is believed capable of providing a lower ride frequency than the FIGS. 1-6 or FIG. 22 strut embodiments because it possesses the highest effective spring stack, and because its coil spring assumes a greater portion of the strut deflection under load. It is further believed that these results can be obtained using elastomeric springs of a lower durometer than those of the FIGS. 1-6 strut. As will be appreciated, this could minimize heating and setting effects associated with higher durometer elastomers. Consequently, the FIGS. 10-15 strut embodiment may be preferable in certain confined space applications, including many lightweight vehicle applications. For this reason, the FIGS. 10-15 strut embodiment may be preferable as a replacement for MacPherson suspension struts. The choice of which strut embodiment to employ, of course, will depend upon space, application and other factors.

PARALLEL STRUT EMBODIMENT

Referring now again in particular to FIGS. 1-6, the parallel strut embodiment includes a reciprocative load bearing assembly (generally referenced by numeral 10) made up of an upper tubular member 12 and a lower tubular member 14, both circular in cross-sectional outline. The upper tubular member 12 fits within the lower tubular member 14 at close clearance and is partially inserted therein in substantially coaxial relation therewith, so that the two members may slide reciprocatively in telescopic relation with one another. To promote free sliding movement, a lower band 16 of low friction material is interposed between the opposed faces of the two members near the lower end of assembly 10 in concentric relation with the longitudinal strut axis 19, as illustrated (FIG. 2). An upper band 17 of similar material is interposed between a lower damper wedge ring 96 associated with a frictional damping assembly (generally referenced by numeral 18) to be described presently. In the example, member 12 corresponds in length to the overall length of the strut at its neutral or design position, less sufficient clearance at the bottom end of assembly 10 to allow the two members to move together telescopically during contraction of the strut from its neutral or design ride position, illustrated in FIGS. 1 and 2, toward its contracted or jounce position, illustrated in FIG. 4. Member 14 is approximately half the length of member 12 and terminates in an annular flange 19 which projects outwardly, transverse to axis 19. This flange supports and is secured to the frictional damping assembly 18, to be described presently. A rebound stop support 20 is secured to flange 19 and surrounds member 12 and the damper assembly in substantially coaxial relation with axis 19, as shown (FIG. 2). An annular flange 22 projects transversely outwardly from the upper terminus of support 20 and supports a rebound stop ring 24 along its underside. A dirt shroud 26 of generally cylindrical configuration overlaps and surrounds stop 20 and overlaps flange 22 in axial direction a distance corresponding to the distance of movement of the strut from its FIGS. 1 and 2 neutral or design ride position toward its FIG. 3 extended or rebound position. Shroud 26 terminates at its lower end in an annular flange 28 which projects inwardly, transverse to axis 19 for contact with stop ring 24 at the FIG. 3 position. An upper mounting plate 30 of circular plan profile includes a downwardly depending flange 32 which is secured to and supports the upper end of shroud 26. Plate 30 is mounted from the upper end of member 12 by an upper load bearing mounting assembly (generally referenced by numeral 34).

The upper mounting assembly 34 is made up of a load bearing ring 36 which is secured to and encircles the upper end portion of member 12 and an inner reinforcing plate 38 of circular outline which registers with and is secured to the interior surface of member 12. This plate also mounts an upper mounting stud 40 adapted to be secured to the body mounting assembly (not shown) of a conventional vehicle strut mount. A jounce stop ring 42 of generally triangular cross-sectional configuration is secured to the lower surface of ring 36, facing downward for engagement with the damper assembly at the FIG. 4 position.

A lower mounting assembly (generally referenced by numeral 44) surrounds the lower end of member 14 in coaxial relation therewith. In the example, assembly 44 includes a mounting bracket 46 adapted to be attached or secured to the steering knuckle or spindle of a conventional vehicle suspension. A sleeve 48 supports bracket 46 and is threadably or otherwise secured to member 14 in load transmitting relation therewith. Sleeve 48 could be secured to member 14 by an appropriate keyed or splined connection such as that depicted in FIG. 20 so that sleeve 48 could be located and secured at various positions along the lower end portion of member 14. With this construction, the spacing between stud 40 and bracket 46 may be varied to adapt the strut to various vehicle mounting requirements.

According to the illustrated example of FIGS. 1-6, two sets of springs, coil spring 50 and a plurality of elastomeric springs 52, 54, 56, 58, 60, 62, 64, 66 and 68 operate in parallel to provide a variable rate spring force, although other types and combinations of springs may be used as will be apparent from the illustrative but not limiting description to follow, depending upon specific application, ride qualities, desired envelope configuration and other factors. It is presently preferred for light vehicle applications to utilize nine elastomeric springs 52-58, stacked in coaxial relation inside members 12 and 14. At the FIG. 2 position, springs 52-68 are precompressed at design load applied between the end loading assemblies 34 and 44.

Each spring 52-68 is composed of soft rubber or other elastomer of a durometer selected in accordance with the desired ride frequency. In the example, the durometer of each spring is approximately 65. It would be possible, however, to provide these springs with varying durometers selected in accordance with desired strut stiffness; for example, the upper springs 52, 54 and 56 could be formed with lower durometer than the lower springs 64, 66 and 68. In this instance, the upper springs would be more readily compressable than the lower springs and therefore would permit a greater degree of initial strut contraction and hence would provide reduced stiffness with an applied load.

As most clearly illustrated in FIG. 1, springs 52-68 are generally ellipsoidal in configuration and are positioned end-to-end with their major axes substantially coinciding with axis 19. As will be appreciated by comparing FIGS. 2, 3 and 4, the sides of springs 52-68 roll or lay down when they are compressed during extension and contraction of assembly 10. This causes their "shape factor" to increase, resulting in a non-linear increase in load carrying capacity and hence stiffness. As will now be apparent, the durometer configuration and number of the elastomeric springs used may vary, depending on the particular application, desired ride frequency, permissible length or height of the strut, and other factors.

The elastomeric springs 52-68 are separated by individual spacers 70, 72, 74, 76, 78, 80, 82 and 84, each generally similar in construction and being circular in profile. Spring 52 underlies upper thrust washer 86 and spring 68 rests upon lower thrust washer 88. Spacers 70-78 and washer 86 have upstanding peripheral lips which register with and are slidable axially along the interior of member 12. spacers 80 and 84 have generally similar lips, except that these register with and are slidable with a transition tube 89, which in turn registers with and is slidable telescopically within the lower end of member 12. Spacer 82 is secured to tube 89. Tube 89 is of sufficient length that it overlaps the lower end of member 12 at all strut positions, and shields spacers 80-84 from contact with the lower end of member 12 during extension and contraction of the strut. Spacers 70-84 and washers 86 and 88 also are rotatable about the longitudinal strut axis and therefore permit springs 52-68 to shift rotatively.

Each spacer and washer 88 includes a plurality of air holes 91 (FIG. 1) spaced at regular intervals about the edge portion thereof. Holes 88 are of an aggregate cross sectional area to promote air flow within the strut sufficient to cool springs 52-68. Washer 88 also includes air holes 90 for admitting air into the strut interior. An end cap 92 is threadably secured to an internally threaded mounting ring 93 secured to the lower end of member 14. Cap 92 supports washer 88 and may be secured in and out of member 14 so as to position washer 88 axially in order to control the amount of precompression applied to springs 52-68. Slots 95 are formed in the underside of cap 92 to receive a key or other tool for screwing cap 92 into and out of member 14.

Still referring to FIGS. 1-6, a coil spring 50 surrounds member 12 coaxially and acts between plate 30 and the frictional damping assembly 18. Assembly 18 in turn transmits the axial component of the spring force to member 14. The upper end of spring 50 is retained and bears against the underside of plate 30. The lower end of spring 50 bears down upon and is retained within an annular groove 94 formed by the damping assembly 18 to be described presently. Spring 50 is compressed simultaneously with springs 52-68 and exerts a load bearing force in parallel therewith. As stated above, spring 50 operates the damping assembly by providing the normal force which is converted into a frictional damping or drag force upon member 12. This normal force is a radial component of the spring force that is derived from the longitudinally directed spring force, as will be described presently.

The frictional damping assembly of this invention includes an upper damper wedge ring 96, a lower damper wedge ring 98 and three damper shoes 100, 102 and 104 (FIG. 5) spaced apart circumferentially about axis 19 in end-to-end relation. Ring 98 is secured to the upper face of the flange 19 and surrounds member 14 at close clearance, with band 17 interposed therebetween. Ring 96 also surrounds member 14 at close clearance, and a band 106 generally similar to bands 16 and 17 is interposed between ring 96 to promote free movement of member 14 with respect thereto. Ring 96 forms the groove 94 within which the lower end of spring 50 is retained. Rings 96 and 98 engage and clamp shoes 100, 102 and 104 therebetween in response to the axial force exerted by spring 50. A circular wiper seal 108 is mounted by ring 96 for sealing contact with the outer surface of member 14.

Each damper shoe is generally arcuate in plan profile or horizontal section as illustrated in FIG. 5, with an inner face of arcuate configuration which conforms to the cross-sectional outline of the exterior surface of member 14. It may be urged against and brought into face-to-face contact with this surface for purposes of exerting a frictional damping or drag force thereon, as will be described presently. Each shoe is generally triangular in vertical cross-section as illustrated in FIG. 2, with its upper and lower surfaces 112 and 114 being inclined at angles which are preselected in order to provide a controllable predetermined damping force during operation of the strut in jounce and rebound. Rings 96 and 98 form conical surfaces which interface with surfaces 112 and 114, respectively. Spring 50 exerts a downward force on ring 96 along a force vector which is substantially parallel to axis 19. By virtue of the inclined orientations of the upper and lower surfaces 112 and 114, a transverse or radial component of this spring force is transmitted via rings 96 and 98 to the damper shoes during both rebound and jounce movement, and acts on a normal force urging them into face-to-face frictional engagement with the outer surface of member 14. The magnitude of this normal force varies in proportion to the spring force applied. It is possible, however, by selecting different angles of inclination for the surfaces 112 and 114, to control the normal force applied during reciprocative strut movement so that the normal force applied during extension toward its rebound position will differ from that applied during contraction toward its jounce position. Since the damping or drag force applied by shoes 100, 102 and 104 is proportional to the normal force, the damping or drag force exerted upon member 14 will vary correspondingly, dependent upon the direction of strut movement.

In the example illustrated, the angles of inclination of surfaces 112 and 114 are selected so that the damping force applied during contraction of the strut under jounce conditions is less than that applied during extension of the strut under rebound conditions. To this end, surface 114 is inclined with respect to axis 19 at a greater angle than that at which surface 112 is inclined thereto. In one exemplary application to a vehicle front end having a 1001 pound sprung load empty and a 1220 pound sprung load fully loaded, surfaces 112 and 114 should be inclined at angles of about 26° and 35°, respectively, with respect to axis 19. The ride frequency depicted by curve 120 remains substantially constant over the stated load range, contrary to that attained by a prior art suspension strut, as depicted by curve 122. As will also be appreciated, the curve 120 ride frequency increases when the wheel load exceeds approximately 700 pounds, indicative of an increase in strut stiffness at a higher load conditions. In the exemplary application mentioned, this could eliminate the need for roll bars which, as mentioned above, are required in many conventional automotive suspensions to provide added cornering stiffness under heavy load conditions.

SERIES STRUT EMBODIMENT

Referring now in particular to FIGS. 10-15, the series strut embodiment includes a reciprocative load bearing assembly (generally referenced by numeral 200) made up of an upper tubular member 202 and a lower tubular member load bearing assembly 204, both circular in cross-section. Assembly 204 is made up of an inner tubular member 206 and an outer tubular member 208, both circular in cross-sectional outline. At the FIG. 10 neutral or design ride position, members 202 and 204 substantially overlap one another in telescopic relation, less sufficient clearance to permit extension and contraction of the strut toward its rebound and jounce positions depicted in FIGS. 11 and 12, respectively. Member 208 is spaced transversely from member 206 a sufficient distance to allow the lower end of member 202 to fit therebetween at close clearance and in telescopic relation therewith. Assembly 200 thus operates reciprocatively in a manner generally similar to assembly 10 of the FIG. 1 strut described above. To promote free sliding movement, two spaced apart bands 210 and 212, each composed of low friction material, are interposed between opposed faces of members 202 and 206 adjacent their lower and upper ends, respectively, in concentric relation with the longitudinal strut axis 213. This flange supports and is secured to the frictional damping assembly of this invention (generally referenced by numeral 216) to be described presently.

A lower mounting assembly (generally referenced by numeral 228) surrounds the lower end of assembly 204 in coaxial relation therewith. In the example, assembly 228 includes a mounting bracket 230 adapted to be attached or secured to the steering knuckle or spindle of a conventional vehicle suspension. A sleeve 232 supports bracket 230 and is threadably or otherwise secured to member 208 in load transmiting relation therewith. A tubular spacer 234 is located between and initially supports the lower ends of members 206 and 208 against transversely applied end forces. Sleeve 232 could be secured to member 208 by an appropriate threaded, keyed or spline connection such as that depicted in FIG. 20 so that sleeve 232 could be located at various positions along the lower end portion of member 208. With this construction, the space between stud 222 and bracket 230 may be varied to adapt the strut to various vehicle mounting requirements, or to adjust for spring set.

According to the illustrated example of FIGS. 10-15, two sets of springs, coil spring 228 and a plurality of elastomeric springs 236, 238, 240, 242, 244 and 246, operate in series to provide a variable rate spring force. It is presently preferred to light vehicle applications to utilize six elastomeric springs stacked in coaxial relation. Unlike the FIGS. 1-6 strut, however, springs 236-246 are in operative contact with the frictional damping assembly, and are toroidal in configuration, surrounding member 202 in substantially coaxial relation therewith. Although spring 228 is outside of springs 236-246, it will be recognized that it could be located inside of springs 236-246 if it were desirable to position spring 228 in operative contact with the frictional damping assembly while maintaining the series operative relation discussed herein.

A generally tubular spring cup 248 supports and transmits forces between both spring sets. Cup 248 supports spring 228 outward of and in partial concentric relation with springs 236-246, and supports springs 236-246 in force transmitting relation with spring 228 and the frictional damping assembly. The upper end of cup 248 overlies and bears down upon the upper elastomeric spring 236. The tubular middle portion of cup 248 surrounds the upper springs, depending upon the extent of strut contraction, as will be apparent from FIGS. 10-12. Cup 248 terminates at its lower end in an outwardly projecting annular flange 249, which supports and retains the lower end of the coil spring 228, as shown (FIG. 10). The upper, inner edge of cup 248 surrounds and is slidable upon the exterior surface of member 202. Cup 248 thus transmits axial forces between the coil spring 228 and the elastomeric springs 236-246 to provide series operation and compression thereof. At the FIG. 11 position, the coil spring and the elastomeric springs, in series, are pre-compressed at design load applied between the upper and lower load bearing assemblies 218 and 228.

Each elastomeric spring is composed of soft rubber or other elastomer of a durometer selected in accordance with the desired ride frequency. In the example, the durometer of each spring is approximately 50. It would be possible, however, to provide these springs with varying durometer selected in accordance with desired strut stiffness; for example, the upper springs 236, 238 and 240 could be formed with lower durometers than the lower springs. In this instance, these springs would be more readily compressable than the lower springs and therefore would permit greater degree of initial strut contraction and hence would provide reduced stiffness with an applied load.

As most clearly illustrated in FIG. 10, springs 236-246 are generally ellipsodial in cross-sectional configuration and are positioned end-to-end with their major axes substantially coinciding with axis 213. As will be appreciated by comparing FIGS. 10, 11 and 12, the sides of springs 236-246 roll or lay down when they are compressed during extension and contraction of assembly 200. This causes their "shape factor" to increase, resulting in a non-linear increase load carrying capacity and hence stiffness. As will now be apparent, the durometer, configuration and number of the elastomeric springs used may vary, depending on the particular application, desired ride frequency, permissible length or height of the strut, and other factors.

Figure 16:
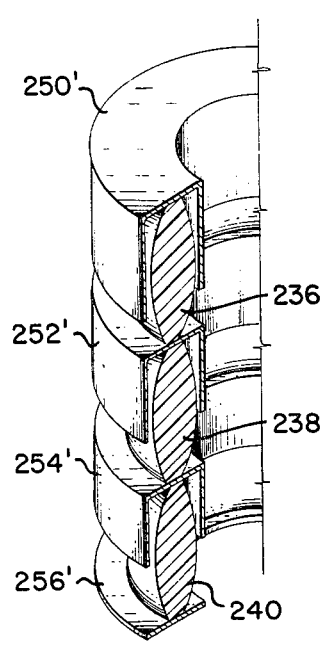
FIG. 16 is a fragmentary perspective of a modified spring assembly for the FIG. 10 strut.
Figure 17:
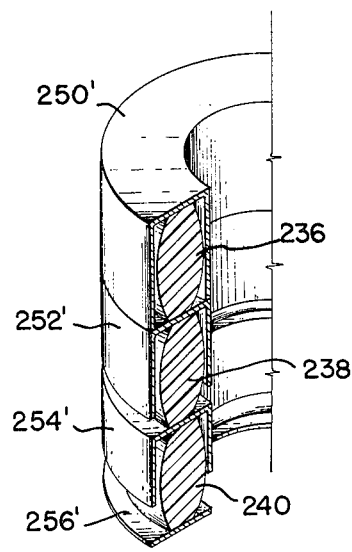
FIG. 17 is a perspective generally similar to FIG. 16, depicting the modified spring assembly partially bottomed.

The elastomeric springs 236-246 are separated by individual spacers 250, 252, 254, 256 and 258 of generally similar flat, ring-shaped configuration and positioned in coaxial relation with member 202. Each spacer extends transversely to axis 213 and terminates at its inner edge in an inner wear ring 260 which surrounds and is slidable upon the exterior surface of member 202. Alternatively, spacers of modified inverted cup cross-sectional configuration could be substituted for spacers 250-258 as depicted in FIGS. 16 and 17, to provide selective bottoming. In the FIG. 16 modification, four such modified spacers are illustrated and designated with primed reference numerals corresponding to the reference numerals of the spacers for which they are substituted. Each FIG. 16 spacer partially encloses its associated spring, leaving the lower end portion of the spring exposed. When compressed, the spring is deformed within the interior of the spacer as depicted by spring 236 in FIG. 17, allowing the spacer 250' to bottom upon the next lower spacer 252'. By providing the FIG. 16 spacers, the upper spacers could be formed to bottom selectively, following a predetermined compression of the respectively associated springs. Thus, it is possible, by causing all or part of the spacers to bottom at a selected load condition, such as jounce, to by-pass all or part of the elastomeric springs. This of course results in an alteration of the spring curve obtained such that the suspension strut appears stiffer under such load conditions.

The frictional damping assembly of the FIGS. 10-15 strut, unlike the frictional damping assembly of the FIGS. 1-6 strut, underlies and supports the elastomeric spring stack and is in direct underlying contact with the lowermost elastomeric spring 246. The frictional damping assembly includes an upper damping wedge ring 262, a lower damper wedge ring 264, and three damper shoes 266, 268, and 270 (FIG. 15) spaced apart circumferentially about axis 213 in end-to-end relation. Ring 264 surrounds member 202 at close clearance and is secured to the upper face of the flange 214. Ring 262 also surrounds member 202 in substantially coaxial relation therewith, but, unlike ring 96 of the FIGS. 1-6 strut, does not contact the outer surface of member 202. Ring 262 includes an upper annular shoulder 272 which projects transversely outwardly and forms a flat supporting surface 274 upon which the lowermost spring 246 rests, as shown. A circular lip seal 276 surrounds and provides a seal between the upper edge of shoulder 214 and ring 262.

Figure 15:
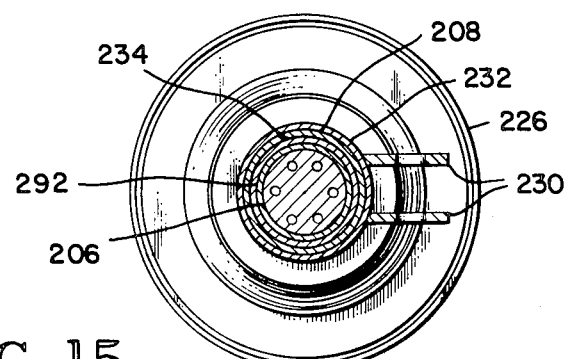
FIG. 15 is a section taken along the line 15—15 in FIG. 10.

Each damper shoe is generally arcuate in plan profile or horizontal section, as illustrated in FIG. 15, with an inner face of arcuate configuration which conforms to the cross-sectional outline of the exterior surface of member 202. It may be urged against and brought into face-to-face contact with this surface for purposes of exerting frictional damping or drag force thereof, as will be described presently. Each damper shoe is generally triangular in vertical cross-section, as illustrated in FIG. 11, with its upper and lower surfaces 276 and 278 being inclined at angles which are preselected in order to provide a controllable predetermined damping force during reciprocative operation of the strut in jounce and rebound. Rings 262 and 264 form conical surfaces which interface with surfaces 276 and 278. The two sets of coil and elastomeric springs illustrated exert a combined downward spring force on ring 272 along a force vector which is essentially parallel to axis 213. By virtue of the inclined orientations of the upper and lower surfaces 276 and 278, a transverse or radial component of this spring force is transmitted via rings 262 and 264 to the damper shoes during both rebound and jounce movement, and acts as a normal force urging them into face-to-face frictional engagement with the outer surface of member 202. The magnitude of this normal force varies in proportion to the spring force applied. It is possible, however, by selecting different angles of inclination for the surfaces 276 and 278, to control the normal force applied during reciprocative strut movement so that the normal force applied during extension toward its rebound position will differ from that applied during contraction toward its jounce position. Since the damping or drag force applied by shoes 266, 268 and 270 is proportional to the normal force, the damping or drag force exerted upon member 202 will vary correspondingly, dependent upon the direction of strut movement.

Figure 18:
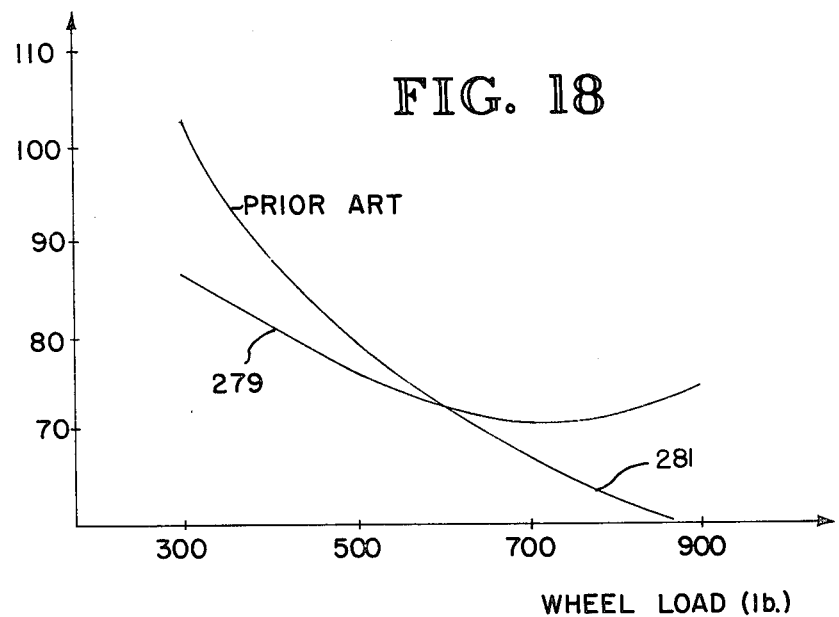
FIG. 18 is a graph of ride frequency vs. wheel load of the FIG. 10 strut and a prior art strut.

In the example illustrated, the angles of inclination of surfaces 276 and 278 are selected so that the damping force applied during contraction of the strut under jounce conditions is less than that applied during extension of the strut under rebound conditions. To this end, surface 278 is inclined with respect to the longitudinal strut axis at a greater angle than that at which surface 276 is inclined thereto. In one exemplary application to a vehicle having a 1001 pound sprung load fully loaded, surfaces 276 and 278 should be inclined at angles of about 30° and 35°, respectively, with respect to axis 213. The ride frequency obtained with the series suspension strut construction described above, as applied to this exemplary application, is depicted in FIG. 18. As will be apparent, the ride frequency depicted by curve 279 remains substantially constant over the stated load range, contrary to that obtained by a prior art suspension strut, as depicted by curve 281. As will also be appreciated, the curve 279 ride frequency increases when the wheel load exceeds approximately 700 pounds, indicative of an increase in strut stiffness at higher load conditions. In the exemplary application mentioned, this could eliminate the need for roll bars which, as mentioned above, are required in many conventional automotive suspensions to provide added cornering stiffness under heavy load conditions.

A rebound assembly (generally referenced by numeral 280) is mounted within member 202. The rebound assembly includes an elongated support member 282 which extends downward from plate 220 along axis 213 and which supports a stop plate 284 at its lower end. Jounce and rebound stops 286 and 288 are supported by mount 290 secured to the inner upper end of member 202. In the example, each stop 286 and 288 is constituted by a resilient shock supporting ring of hemispherical cross-sectional configuration. Jounce stop 286 is engageable with the underside of plate 220 at the contracted or jounce position of the strut illustrated in FIG. 12, the rebound stop 288 is engageable with plate 284 at the extended or rebound position of the strut as depicted in FIG. 11.

Figure 20:
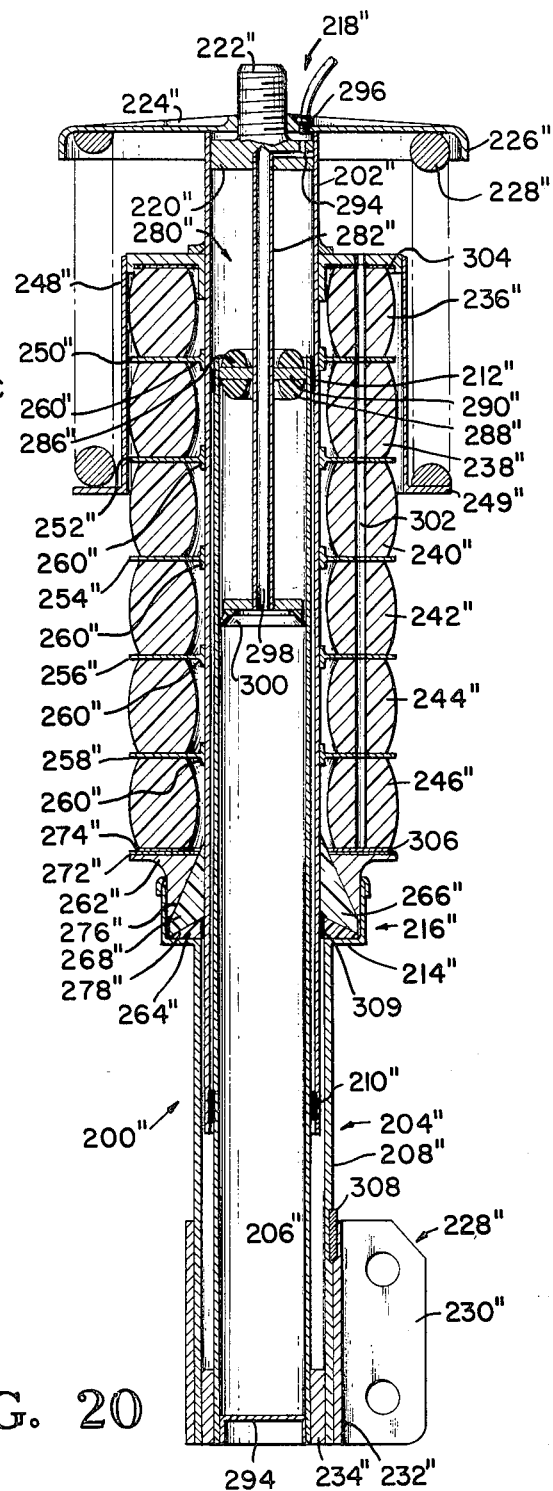
FIG. 20 is a longitudinal section of a modified FIG. 10 strut.

The interior of the FIGS. 10–15 strut communicates with ambient atmosphere via a dust filter 292 which closes the lower end of member 206. Alternatively, the strut interior may be closed by eliminating filter 292 and substituting an appropriate end closure 294 in its place, as depicted in FIG. 20. In this modified version of the FIGS. 10–15 strut, in which like parts are designated with the same reference numerals, double primed, the interior of assembly 200" is pressurized. An appropriate air passage 294 is formed by plate 220". A gas fitting 296 connectable with an exterior source of pressurized gas, such as air, communicates with the outer end of passage 294. The inner end of passage 294 communicates with a bore 298 formed along the entire length of member 282". A ring seal 300 is secured to the undersurface of plate 284" to seal the space between plate 284" and closure 294 during expansion and contraction of the strut.

As will be apparent, the FIGS. 10–15 elastomeric spring stack is exposed to and is thus cooled by direct contact with ambient air. To promote further cooling in the FIG. 20 modified strut, a series of longitudinal passages may be formed within the elastomeric springs (one of which is illustrated and referenced by numeral 302) by forming each spring with a series of circumferentially spaced apart cooling passages which extend in parallel relation to its major axis between its upper and lower load bearing surfaces. In this case, spacers 250"–258" are formed with holes which register with these cooling passages. Thus, by positioning all the springs and spacers with their cooling passages and holes aligned coaxially, multiple spaced apart passages 302 extending the entire height of the spring stack may be obtained. Additionally, upper and lower thrust washers 304 and 306, each composed of low friction material, may be interposed between the upper face of spring 236 and the spring cup 248, and the lower face of spring 246 and the spring supporting surface 274, respectively. These thrust washers permit the spring stack to remain stationary or rotate about the longitudinal strut axis as necessary in response to applied axial or torsional loading conditions. The spacers 250"–258" may be formed of appropriate low friction material to permit relative rotative shifting of springs 236"–246".

Still referring to FIG. 20, a locking key 308 is interposed between sleeve 232" and member 208" adjacent the mating threads thereof. Key 308 locks sleeve 232" in a fixed position restraining it from shifting rotatively. Thus, it is possible to adjust the spacing between stud 222" and bracket 230" by first screwing sleeve 232" up or down along the threads illustrated to position sleeve 232" at a desired location, and then locking sleeve 232" at that location by operating key 308. An additional band 309 of low friction material may be interposed between the opposed faces of ring 264" and member 202".

Referring now to FIG. 21, in which parts corresponding to those already described with reference to FIGS. 10–15 and 20 are designated with the same reference numerals, triple primed, the elastomeric springs may be cast as a unitary body 310 having spirally superimposed sections 312 reinforced by a metallic or composite coil spring 314 embedded therein. Spring 314 supplements the spring force exerted by body 310 when compressed, as described above, and also provides lateral reinforcement for resisting buckling. The interior of the FIG. 21 modified strut also may be filled with gas as in the FIG. 20 strut, except that the interior of the FIG. 21 strut is not pressurized due to the absence of any seal associated with plate 284"'. The externally supplied gas thus serves primarily to cool the strut but may be provided from a clean source. This of course minimizes fouling or the accumulation of dust or debris that might otherwise gain entrance to the strut interior, despite use of a filter or the like as in the case of the FIGS. 10–15 strut.

SINGLE SPRING STRUT EMBODIMENT

Referring now to FIG. 22, in which parts corresponding to those already described with reference to FIGS. 10–15 and 20 are designated with the same reference numerals, quadruple primed, a single coil spring 400 may be substituted for both the coil and elastomeric springs of the FIGS. 1–6 and FIGS. 10–15 strut embodiments. In this third presently preferred embodiment of the invention, spring 400 acts as the sole source of spring force providing both load bearing support and operating the damping assembly 216"". In the example, spring 400 is a coil spring which has a variable spring rate by virtue of its progressively decreasing coil diameter. Spring 400 is positioned with its larger diameter coils upright for contact with cap 224"", with its smaller diameter coils in contact with assembly 216"". It should be recognized, however, that other types of springs, whether coil, elastomeric or other, may be used, provided they provide the variable rate spring force in accordance with this invention. For example, spring 310 (FIG. 21) could be used in place of spring 400 in certain applications.

The damper shoes associated with the damping assemblies of all three strut embodiments illustrated and described herein preferably are composed of the same material and therefore their upper and lower inclined surfaces which contact the respectively associated wedge rings have the same coefficients of friction, depending of course upon the materials used. One material suitable for use as the damper shoe and wedge ring material is nylon or other polymeric composition having adequate hardness. As depicted in FIG. 23, the damper shoes of any of these strut embodiments may be formed with wedge contact surfaces 502 and 504 having different coefficients of friction. Inserts 506 and 508 may be provided along the upper or lower faces of the damper shoes, or both. Each insert could be composed of a material or materials having an appropriate coefficient of friction. In this case, the angles of inclination of the wedge contact surfaces with respect to the longitudinal strut axis could be identical since the normal force or forces obtained would be determined by the coefficients of friction of inserts 506 and 508 instead of the angles of inclination. It also would be possible to fabricate the wedge rings of a different material, such as aluminum to achieve the same result. As will now be apparent, both the angles of inclination and the coefficients of friction of the wedge contact surfaces or of the wedge rings could be varied in the same damper assembly, to obtain desired control of the damping force applied.

Still referring to FIG. 23, the tubular member 507 against which the damper shoe 509 is urged may include an insert 512 of low friction material, preferably located so that the damper shoe will overlie insert 512 when positioned at its neutral or design ride position. Insert 512 forms a low friction contact surface which reduces static or starting friction of the shoe 509, as well as permitting shoe 509 to return to its neutral or design ride position following a jounce or rebound cycle. Alternatively, the contact surface formed by member 507 could be polished or otherwise treated to form one or more areas of desirable low friction characteristics.

The FIG. 23 damping assembly additionally may include an elastomeric or visco-elastic pad 514 which may be located in underlying relation to the lower damper wedge ring 516, as shown, or which may be located between ring 516 and shoe 509. Pad 514 is composed of a visco-elastic material such as silicone rubber compounds or a relatively stiff and hence high spring rate elastomer, such as neoprene or butyl, with sufficient viscous damping ability that it tends to damp certain high velocity applied loads, such as those applied by tar strips in typical automotive applications, which normally would not produce enough movement of the friction damping shoe(s) to provide adequate damping. Thus, the viscous damping provided by pad 514 could in these instances supplement operation of the frictional damping assembly so that adequate damping is attained. Pad 514 could be positioned at other locations between the vehicle body and wheel assemblies, at which such damping effects could be obtained.

The provision of the lower load bearing assemblies 204, 204″ and 204″″ made up of inner and outer tubular members allows the upper bands 212, 212″ and 212″″ to be located at the maximum possible longitudinal spacing from the lower bands 210, 210″ and 210″″ since the upper bands are located adjacent the upper ends of the inner members 206, 206″ and 206″″. The upper and lower bands act as slide bearings between the telescopically slidable members of the load bearing assemblies. By spacing them as shown, these assemblies are strengthened against the effects of bending loads which, as mentioned above, might otherwise tend to cause the slidable members to stick or bind. Adequate bearing spacing is provided in the FIGS. 1–6 parallel strut because the damper assembly, which mounts the upper band 17, is located nearer the upper end of the load bearing assembly than the damper assembleis of the FIGS. 10–15 or FIG. 22 embodiments. It will be recognized that other types of bearings may be used.

FIGS. 24 and 25 depicts a further modification of the FIGS. 10–15 or FIG. 22 load bearing assemblies in which the inner member 206 or 206″ and 206″″ may be eliminated. Parts corresponding to those already described with reference to FIGS. 10–15 are designated with the same reference numerals, quintuple primed. In this construction, upper and lower tubular members 602 and 604 are coaxially positioned and telescopically slidable with respect to one another in a manner generally similar to the load bearing assembly of the series strut embodiment of FIGS. 10–15 described previously. Unlike that embodiment, however, four damper shoes 606, 608, 610 and 612 extend through openings 614 in member 604 for contact with the outer surface of member 602 to provide a frictional damping or drag force in response to the spring force applied by the elastomeric springs 616–626 and coil spring 628 in series. Member 604 includes a reinforced upper portion 616 of thicker wall thickness than lower portion 618 to strengthen member 604 adjacent openings 614.

A rebound assembly (generally referenced by numeral 620) is mounted within member 604. The rebound assembly includes an elongated support member 622 which extends upward from plate 624 along axis 213″″″ and which supports rebound stop 626 at its upper end. Plate 624 is secured to the lower end of member 604 and supports a jounce stop 628. A stop plate 630 is secured to the lower end of member 602. In the example, each stop 626 and 628 is constituted by a resilient shock supporting ring of hemispherical cross-sectional configuration. Jounce stop 628 is engageable with the underside of plate 630 at the contracted or jounce position of the strut and the rebound stop 626 is engageable with the upper side of plate 630 at the extended or rebound position of the strut.

A flexible diaphragm seal 632 may be secured between plate 224″″″ and flange 249″″″. Seal 632 could be composed of appropriately coated fabric capable of withstanding solvents, grease, corrosive chemicals and the like that may be encountered in practical use. Seal 632 prevents dirt and other contaminants from entering the strut. Similar seals may be applied to the strut embodiments described previously.

As will now be appreciated, one advantage of the suspension strut of this invention is that, unlike hydraulic shock absorbers, the effects of wear on strut performance are compensated for automatically by the damper shoe or shoes, which shift inwardly toward the longitudinal strut axis as their arcuate contact surfaces are worn away. Consequently, the frictional damping force obtained remains essentially constant throughout the service life of the damper shoes. As depicted in FIG. 26, damper shoe wear appears as a convergence of the upper and lower wedge rings 262″″″ and 264″″″. In the example, the upper wedge ring 262″″″ includes a depending skirt portion 634 which overlaps the outer periphery of the lower wedge ring 264″″″. As the damper shoes are worn away and shift inwardly, the lower end of portion 634 gradually projects below ring 264″″″ and eventually contacts sensor 636, which causes an appropriate wear signal or alarm (not shown) to be activated, indicative that the damper shoes require replacement. The spacing between the point of contact of portion 634 with sensor 636 and the location of portion 634 at its fully retracted position illustrated, when the damper shoes are unworn, is selected in accordance with the amount of allowable damper shoe wear. As an alternative to sensor 636, portion 634 could present a visible or gaugeable marker or telltale relative to wedge ring 264″″″, constantly indicating the extent of damper shoe wear. Unlike hydraulic shock absorbers, this invention thus may provide an indication of wear, in response to which appropriate maintenance activities can be can be undertaken before strut performance is affected adversely.

It may be desirable in some applications to restrain the damper shoes of any or all of the three strut embodiments described herein against relative rotative shifting about the longitudinal strut axis. This may be accomplished by forming complementary tongue-and-groove connectors on the lower surfaces of the damper shoes and the upper surfaces of the lower wedge rings, respectively, as at 640 in FIG. 26. Since the lower wedge rings are fixed with respect to the load bearing assemblies, the tongue-and-groove connectors will retain the damper shoes in fixed positions with respect to one another and with respect to the load bearing assembly.

Although three presently preferred embodiments of the invention have been illustrated and described herein, variations will become apparent to one of ordinary skill in the art. Accordingly, the invention is not to be limited to the specific embodiments illustrated herein, and the true scope and spirit of the present invention are to be determined by reference to the appended claims.

The embodiments of the invention in which an exclusive property or privelege is claimed are defined as follows:

1. A suspension strut, comprising:

an elongated tubular load bearing assembly adapted to extend and contract reciprocatively along its longitudinal axis from a design position toward a rebound position and a jounce position, respectively;

first load bearing spring means surrounding said load bearing assembly providing a first spring force for supporting said load bearing assembly;

second load bearing spring means within said load bearing assembly providing a second spring force in parallel with said first spring force for supporting said load bearing assembly; and a frictional damping assembly including damping means, and operator means surrounding said load bearing assembly for receiving said first spring force and applying a component of said first spring force to said damping means as a normal force urging said damping means inwardly into contact with said load bearing assembly so as to apply a frictional damping force to said load bearing assembly during extension and contraction thereof.

2. The strut of claim 1 wherein said second load bearing spring means are made up of a plurality of elastomeric springs stacked end-to-end along the length of said load bearing assembly.

3. The strut of claim 2 wherein said elastomeric springs are generally ellipsoidal and are stacked with their major axes in coaxial relationship.

4. The strut of claim 3, further including spacers interposed between said elastomeric springs, a thrust washer adjacent each end of the spring stack, and means operatively connected with said load bearing assembly for exerting a precompression force on the spring stack, each of said spacers registering with the interior of said load bearing assembly, one of said spacers being secured to internal tube means slidable with respect to the interior of said load bearing assembly, and the remaining spacers each including an outer lip slidable upon the interior of said load bearing assembly.

5. The strut of any of claims 1-4 wherein said first load bearing spring means are a coil spring.

6. The strut of claim 1 wherein said first load bearing spring means have a constant spring rate.

7. The strut of claims 1 or 6 wherein said second load bearing spring means have a variable spring rate.

8. The strut of claim 1 wherein said load bearing assembly includes two telescopically movable sections and spaced apart bearings interposed between said sections.

9. The strut of claim 8 wherein said sections include an elongated tubular inner member adapted to receive said frictional damping force and an elongated tubular outer member telescopically disposed with respect to said inner member, one of said bearings being located adjacent one end of said inner member and another of said bearings being located adjacent said operator means.

10. The strut of claim 9, including jounce stop means fixed with respect to said inner member for engaging said operator means at the jounce position of the strut, and rebound stop means fixed with respect to said outer member for engaging said outer member at the rebound position of the strut.

11. The strut of claim 1 wherein said first spring force is directed generally parrallel to said axis, and wherein said operator means include two spaced apart relatively movable wedge rings adapted to clamp said damping means therebetween while urging said damping means inwardly generally transverse to said axis in response to said spring force.

12. The strut of claim 11 wherein said damping means include two contact surfaces respectively engageable with said wedge rings and inclined with respect to said axis at respective angles selected to control said frictional damping force depending upon whether said load bearing assembly is moving toward its rebound position or its jounce position.

13. The strut of claim 11 wherein said damping means include two contact surfaces respectively engageable with said wedge rings and having coefficients of friction selected to control said frictional damping force depending upon whether said load bearing assembly is moving toward its rebound position or its jounce position.

14. The strut of any of claims 11-13 wherein said damping means include a plurality of damping elements spaced apart circumferentially about said load bearing assembly in end-to-end relation so as to apply frictional damping forces to said load bearing means simultaneously at spaced apart locations along the periphery thereof.

* * * * *